United States Patent [19]
LaBerge

[11] Patent Number: 5,815,674
[45] Date of Patent: Sep. 29, 1998

[54] METHOD AND SYSTEM FOR INTERFACING A PLURALITY OF BUS REQUESTERS WITH A COMPUTER BUS

[75] Inventor: Paul A. LaBerge, Shoreview, Minn.

[73] Assignee: Micron Electronics, Inc., Nampa, Id.

[21] Appl. No.: 680,443

[22] Filed: Jul. 15, 1996

[51] Int. Cl.$^6$ .................................................. H01J 13/00
[52] U.S. Cl. ...................... 395/287; 395/292; 395/291; 395/309; 395/298
[58] Field of Search ..................... 395/287, 290, 395/291, 292, 293, 297, 298, 299, 304, 305, 309, 728, 729, 731, 732, 856, 857, 859, 860

[56] References Cited

U.S. PATENT DOCUMENTS

| | | | |
|---|---|---|---|
| 5,473,762 | 12/1995 | Krein et al. | 395/287 |
| 5,481,680 | 1/1996 | Larson et al. | 395/292 |
| 5,485,586 | 1/1996 | Brash et al. | 395/292 |
| 5,499,345 | 3/1996 | Watanabe | 395/297 |
| 5,519,838 | 5/1996 | Ziegler et al. | 395/299 |
| 5,528,767 | 6/1996 | Chen | 395/293 |
| 5,555,425 | 9/1996 | Zeller et al. | 395/800.01 |
| 5,583,999 | 12/1996 | Sato et al. | 395/291 |
| 5,598,575 | 1/1997 | Dent et al. | 395/800 |
| 5,644,754 | 7/1997 | Weber et al. | 395/292 |
| 5,649,206 | 7/1997 | Allen | 395/729 |
| 5,710,891 | 1/1998 | Normoyle et al. | 395/299 |

OTHER PUBLICATIONS

M. Morris Mano, Computer System Architecture (Second Edition), Prentice–Hall, Inc. 1982 pp. 406–415 and pp. 454–462.

*Primary Examiner*—Ayaz R. Sheikh
*Assistant Examiner*—Raymond N. Phan
*Attorney, Agent, or Firm*—Seed and Berry LLP

[57] ABSTRACT

A bus controller controls access to a processor bus by arbitrating between bus requests received from a plurality of bus requesters. The bus controller employs a pipelining arbitration mechanism in which a first bus requests from each bus requester is buffered to allow each bus requester to begin producing a second bus request before one of the first bus requests is selected by arbitration. As such, the bus controller performs arbitration between the first bus requests in parallel with the generation of the second bus requests by the bus requesters. The parallel pipelining approach enables the bus controller to base its arbitration decision on plural bus requests from each bus requester. The bus controller can select two bus requests from a first bus requester before selecting any of the bus requests from the other bus requesters.

12 Claims, 3 Drawing Sheets

METHOD AND SYSTEM FOR INTERFACING A PLURALITY OF BUS REQUESTERS WITH A COMPUTER BUS

DESCRIPTION

Technical Field

The present invention relates to computer bus control, and more particularly, to pipelined arbitration of bus requests from a plurality of bus requesters.

Background of the Invention

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The process of allocating time or bandwidth on a computer bus among plural bus requesters is known as arbitration. Typically, an arbiter grants access for a predetermined time period or bandwidth window to whichever bus requester first requests use of the bus. If plural bus requesters have requests for use of the bus pending, then the arbiter typically employs a rotational priority scheme to share the bus among the bus requesters. In a rotational priority scheme, the use of the bus is given for one bandwidth window to each bus requester in sequential order. Thus, the rotational priority scheme gives each bus requester the same amount of bus time as every other bus requester connected to the bus.

One problem with prior art arbitration schemes is that each bus requester can only generate a single bus request at a time. That is because each bus requester must keep its first bus request active until the arbiter selects the bus request. Upon selecting the first bus request of a selected bus requester, the arbiter captures the selected bus request in a latch and then transmits the bus request on the computer bus when the computer bus becomes available. In addition, the arbiter transmits to the selected bus requester an acknowledgment indicating that selected bus request was captured. In response to receiving the acknowledgment from the arbiter, the select bus requester can generate and transmit a second bus request to the arbiter. Each of the other bus requesters similarly must wait until its first bus request is selected before generating a second bus request. As such, high bandwidth bus requesters are prevented from generating bus requests at their optimum speed. Moreover, the arbiter must make arbitration decisions without the benefit of plural bus requests from any of the bus requesters.

SUMMARY OF THE INVENTION

The invention is directed to a method, system, and bus controller for interfacing a plurality of bus requesters with a computer bus. In a first embodiment, the bus controller receives a first bus request from each of the plurality of bus requesters. The bus controller simultaneously stores each of the first bus requests and then arbitrates between the first bus requests for access to the computer bus by selecting one of the first bus requests for transmission on the computer bus. Preferably, the bus controller transmits to each of the bus requesters an indication that the first bus request for the bus requester is stored in the bus controller. The indication transmitted enables each bus requester to prepare a second bus request while the first bus requests are stored in the bus controller.

In one embodiment of the invention, the bus controller bases its arbitration decision on plural bus requests from at least one of the bus requesters. The increased information provided by plural bus requests enables the bus controller to make better decisions regarding the allocation of the processor bus bandwidth among the bus requesters. In particular, the bus controller could select two bus requests from a first bus requester before selecting any of the bus requests from the other bus requesters. Thus, the inventive bus controller provides a more flexible approach to bus arbitration in addition to the increased speed produced by the pipelined arbitration approach of the present invention.

In one embodiment, the bus controller preferably includes a plurality of import ports that receive a first bus request from each of the plurality of bus requesters. In addition, the bus controller includes a plurality of storage buffers that store the first bus requests. The bus controller also includes a bus arbiter that causes the first bus requests to be transferred from the plurality of input ports to the plurality of storage buffers for storage therein. In addition, the bus arbiter transmits to each of the bus requesters an acknowledgment signal indicating that the first bus requests from the bus requesters are stored in the plurality of storage buffers. The bus arbiter is structured to arbitrate between the first bus requests to select one of the first bus requests for transmission on the computer bus. Alternatively, the bus arbiter can also be structured to select first and second bus requests from a first one of the bus requesters before selecting any bus requests from a second one of the bus requesters.

DETAILED DESCRIPTION OF THE INVENTION

Figure 1:
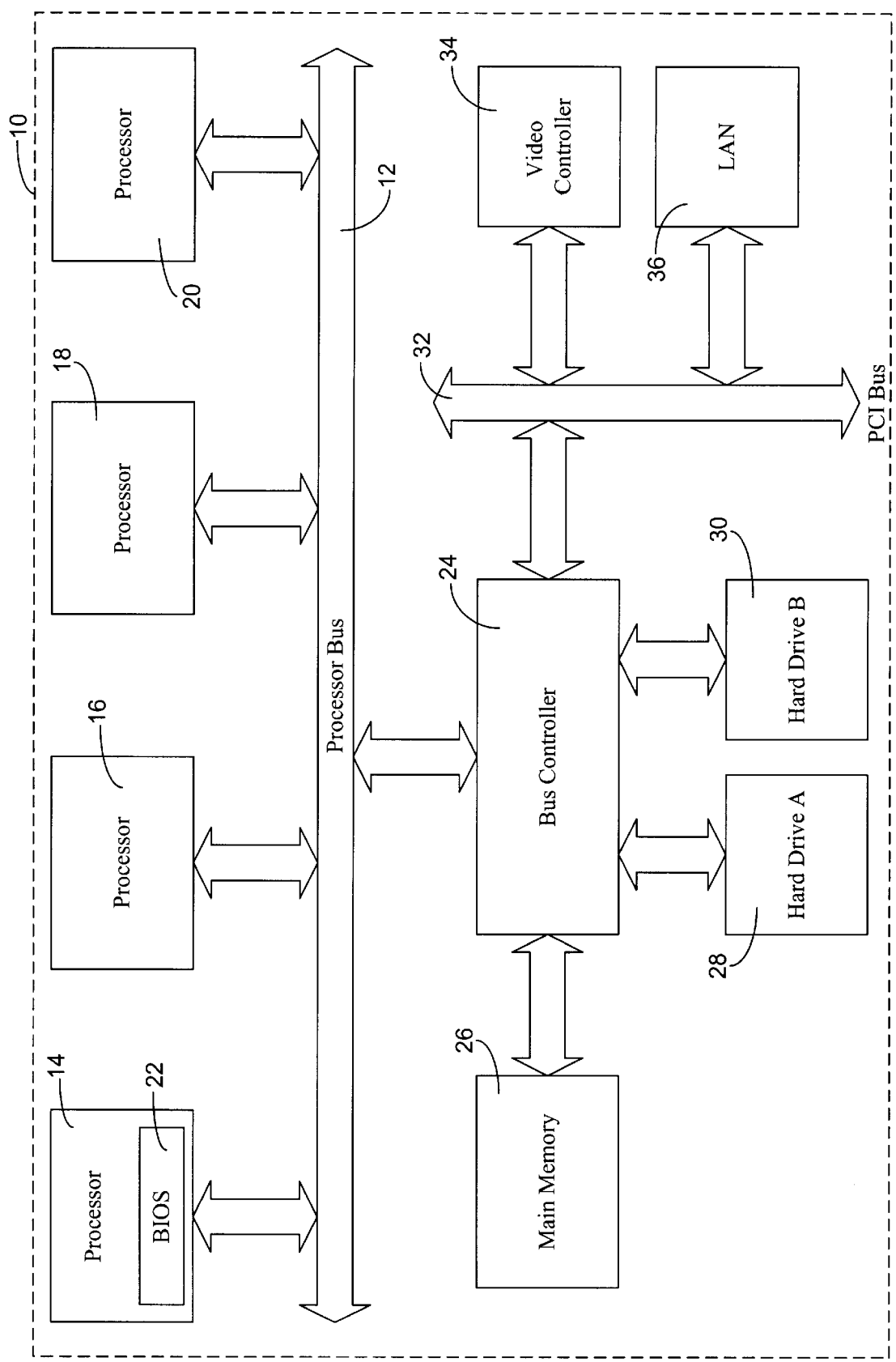
FIG. 1 is a block diagram of a computer system according to the present invention.

Shown in FIG. 1 is a computer system 10 that interfaces computer system modules using a processor bus 12. The computer system 10 includes a multiprocessor system architecture in which first through fourth computer processors 14, 16, 18, 20 are each coupled to the processor bus 12. Each of the processors 14, 16, 18, 20 can be any of numerous known computer processors, such as the Intel P6 processor. It will be appreciated that the invention also is applicable to computer systems employing more or fewer processors. At least one of the processors, such as the first processor 14, includes a basic input/output system (BIOS) 22 that controls how information is transmitted between elements or modules of the computer system. The BIOS 22 is a set of software routines that are typically stored in read-only memory (ROM) of the processor 14. The BIOS 22 is executed by the processor shortly after turning on the computer system 10 in order to initialize the connections between the computer system modules.

The computer system 10 also includes a bus controller 24 that controls access to the processor bus 12 by a plurality of bus requesters 26, 28, 30, 32. Each bus requester is a computer system module that requests use of the processor bus 12. As shown in FIG. 1, the bus requesters include a main memory 26, a hard drive A 28, a hard drive B 30 and a Peripheral Component Interconnect (PCI) bus 32. Further, the computer processors 14–20 also are bus requesters. The PCI bus 32 is shared by two subrequesters: a video controller 34 and a local area network (LAN) 36. It will be appreciated that the particular modules shown as bus requesters 26–32 and subrequesters 34–36 are exemplary only and numerous other types and numbers of bus requesters could be employed without departing from the invention. In addition, the invention is equally applicable to provide an arbitration mechanism for the processor bus 12, the PCI bus 32, or any other computer system bus.

The bus controller 24 controls access to the processor bus 12 by arbitrating between bus requests received from the bus requesters 26–32. As used herein, each "bus request" includes a transaction, such as a read or write, that is to be transmitted on the processor bus 12. Each transaction includes an identification of the type of action to be performed (e.g., read), the address to which the action is directed, and the data being written or read.

In contrast to prior art computer systems, the bus controller 24 employs a pipelining arbitration mechanism in which a first bus request from each bus requester 26–32 is buffered to allow each bus requester to begin producing a second bus request before one of the first bus requests is selected. As such, the bus controller 24 performs arbitration between the first bus requests in parallel with the generation of the second bus requests by the bus requesters. This contrasts with the serial arbitration approach of prior art arbitration mechanisms in which each bus requester is prevented from generating a second bus request until its first bus request has been selected by the arbitration mechanism. The parallel, pipelining arbitration approach of the present invention enables the bus controller 24 to keep up with high bandwidth bus requesters.

In addition, the parallel, pipelining arbitration approach enables the bus controller 24 to base its arbitration decision on plural bus requests from each bus requester. The increased information provided by plural bus requests enables the bus controller 24 to make better decisions regarding the allocation of the processor bus bandwidth among the bus requesters 26–32. For example, the bus controller 24 could decide that the bus requests from a first bus requester are more important than the bus requests from other bus requesters and therefore select two bus requests from the first bus requester before selecting any of the bus requests from the other bus requesters. Thus, the present invention provides a more flexible approach to bus arbitration in addition to the increased speed produced by the parallel, pipelined arbitration approach.

Figure 2:
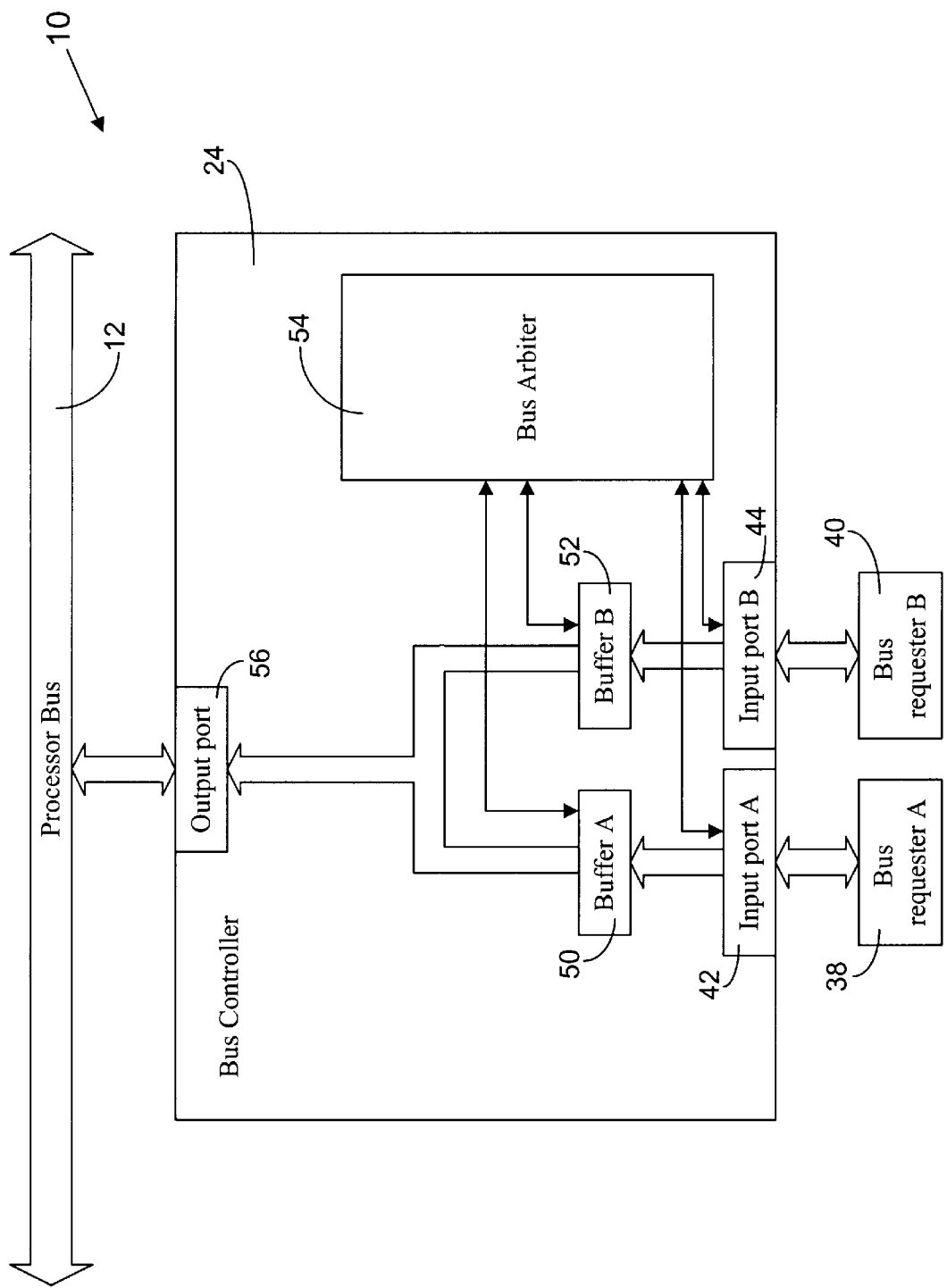
FIG. 2 is a block diagram of the computer system shown in FIG. 1 including internal component of a bus controller.

A more detailed view of the bus controller 24 of the computer system 10 is shown in FIG. 2. The bus controller 24 couples bus requesters A and B 38, 40 to the processor bus 12. The bus requesters 38, 40 can be any of the bus requesters 26–32 shown in FIG. 1 or any other bus requesters. Further, only two bus requesters are shown for simplicity, but the invention is applicable, and more advantageous, when more than two bus requesters are connected to the bus controller 24. The bus controller 24 includes input ports A and B 42, 44 coupled by data lines 46, 48 to the bus requesters A and B 38, 40 respectively. The input ports A and B 42, 44 are coupled to storage buffers A and B 50, 52, respectively, and each of the input ports and the storage buffers is coupled to a bus arbiter 54. Thus, each bus requester is uniquely associated with an input port and a storage buffer. Each input port 42, 44 includes numerous pins for a request line, address lines, data lines and other control lines that help to interface the bus requesters 38, 40 with the bus controller 24 and the processor bus 12.

The bus controller 24 employs the pipelined arbitration approach discussed above to select bus requests from the bus requesters 38, 40 for transmission of the transaction portions of the selected bus requests on the processor bus 12. In response to receiving a first bus request from the bus requester A 38 at the input port A 42, the bus arbiter 54 stores the first bus request in the storage buffer A 50 if the buffer A was empty. In addition, the bus arbiter 54 transmits to the bus requester A 38 an acknowledgment signal indicating that the first bus request is stored in the storage buffer A 50. Likewise, in response to receiving a first bus request from the bus requester B 40 at the input port B 44, the bus arbiter 54 stores the bus request in the storage buffer B 52 and transmits to the bus requester B an acknowledgment signal indicating that its first bus is stored in the storage buffer B. Thus, the bus controller 24 simultaneously stores the first bus requests from the bus requesters A and B 38, 40 in the storage buffers A and B 50, 52 before performing arbitration on the bus requests. Also, by transmitting the acknowledgment signals to the bus requesters A and B 38, 40, the bus controller 24 enables each of the bus requesters A and B to prepare a second bus request while the first bus requests are stored in the storage buffers A and B 50, 52. Assuming that each of the requesters A and B, 38, 40 requires further use of the processor bus 12, each of the requesters A and B prepares and transmits to the bus controller 24 a second bus request.

The bus arbiter 54 in the bus controller 24 arbitrates between the bus requests received by the bus controller based on a predefined arbitration algorithm. The bus arbiter 54 is coupled to the storage buffers 50, 52 to arbitrate between the first bus requests stored in those buffers. In addition, the bus arbiter 54 preferably views the second bus requests at the input ports 42, 44 to arbitrate between the first and second bus requests.

Preferably, the bus controller 24 is structured such that the selected bus request must come from one of the storage buffers 50, 52 rather than directly from the input ports 42, 44 to prevent a second bus request from being transmitted on the processor bus before a first bus request from the same bus requester. This is accomplished by coupling the storage buffers 50, 52 directly to an output port 56 coupled to the processor bus 12 without directly coupling the input ports 42, 44 to the output port. When the bus arbiter 56 selects one of the bus requests in the storage buffers 50, 52 based on the arbitration algorithm, the bus arbiter causes the selected bus request to be transmitted from its storage buffer to the processor bus 12 via the output port 56.

When the selected bus request is transmitted from one of the buffers 50, 52, the second bus request from the input port associated with the storage buffer from which the selected bus request was taken is moved into that storage buffer. For example, if the first bus request stored in the storage buffer A 50 is selected for transmission on the processor bus 12 via the output port 58, then the second bus request stored in the input port A 42 is moved into the storage buffer A. In addition, the bus arbiter 54 transmits to the bus requester A 38 an acknowledgment signal indicating that the input port A 42 is available for a new bus request. After the second bus request is moved into the storage buffer A 50, then the arbiter 56 can cause the second bus request to be transmitted on the processor bus 12 via the output port 58. Depending on the particular arbitration algorithm employed, the second bus request in the storage buffer A 50 can be transmitted on the processor bus 12 before or after the first bus requested from the bus requester B 40 is transmitted from the storage buffer B 52.

Figure 3A:
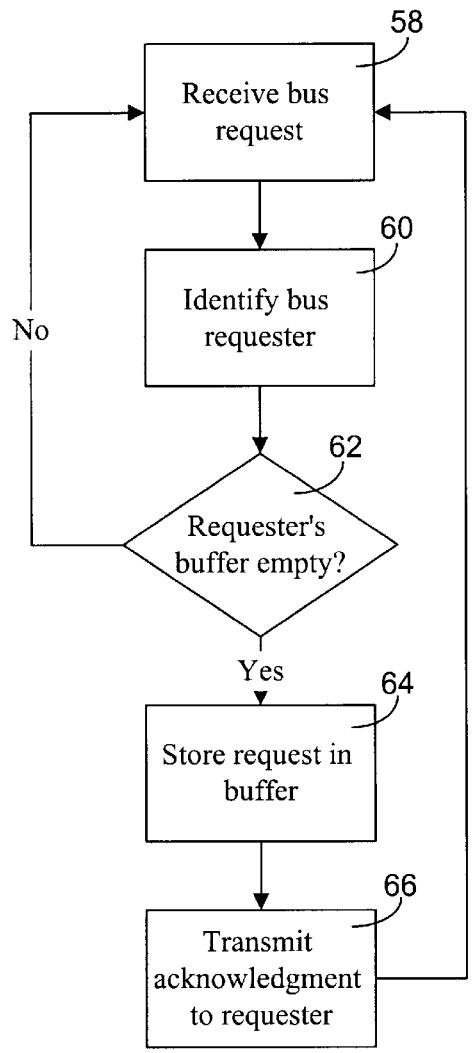
FIG. 3A is a flow diagram of a first part of a method of interfacing plural bus requesters with a computer bus according to the present invention.
Figure 3B:
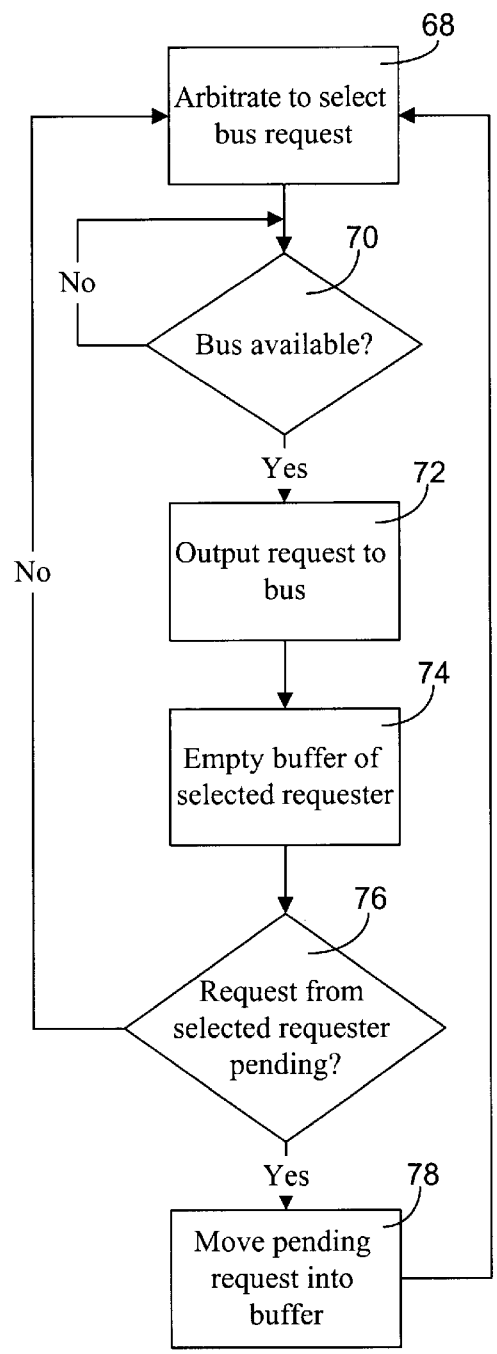
FIG. 3B is a flow diagram of a second part of the method of interfacing plural bus requesters with a computer bus according to the present invention.

Shown in FIGS. 3A and 3B is a flow diagram of a method of interfacing a plurality of bus requesters with the processor bus 12 according to the present invention. In step 58 of FIG. 3A, the bus controller 24 receives a bus request from one of the bus requesters 38, 40. In step 60, the bus controller 24 identifies the bus requester that issued the bus request received in step 58. For example, if the bus controller 24 received the bus request at the input port A 42 in step 58, then in step 62 the bus controller 24 would identify the bus requester A 38 as having sent the bus request because the bus requester A is uniquely associated with the input port A. In step 62, the bus controller 24 determines whether the storage buffer associated with the identified bus requester is empty. Returning to the example, if the bus request was received at the input port A 42, then the bus controller 24 checks whether the storage buffer A 50 is empty because the buffer A 50 is uniquely associated with the input port A 42. If the identified bus requester's buffer is empty, then in step 64, the bus controller 24 stores the bus request in the identified bus requester's buffer.

In step 66, the bus controller transmits to the identified bus requester the acknowledgment signal indicating that the bus request is stored in the appropriate storage buffer. As discussed above, the acknowledgment signal enables the identified bus requester to generate a new bus request while the first bus request is stored in the identified bus requester's storage buffer. After transmitting the acknowledgment signal in step 66, the method returns to step 58 to receive any new bus requests that are issued. Similarly, if step 62 determined that the identified requester's buffer is not empty, then the method returns to step 58 to receive new bus requests without performing steps 64 and 66.

In step 68 of FIG. 3B, the bus controller 24 arbitrates between the bus requests stored in the storage buffers 50, 52 and any bus requests at the input ports 42, 44. The result of the arbitration is that one of the bus requests is selected for transmission of the transaction portion of the selected bus request on the processor bus 12. In step 70, the bus controller 24 determines whether the processor bus 12 is available for receiving a transaction from the bus controller. When the processor bus 12 becomes available, then in step 72 the bus controller causes the transaction portion of the selected bus request to be transmitted from one of the storage buffers 50, 52 to the processor bus 12 via the output port 58. In step 74 the bus controller 24 empties the storage buffer from which the selected bus request was taken. It will be appreciated that step 74 can be implemented by physically clearing the bits of the storage buffer or simply by setting a flag bit to indicate that the contents of the storage buffer can be overwritten by a new bus request. In step 76, the bus controller determines whether there is a bus request pending at the input ports for the bus requester that issued the previously selected bus request. If so, then the pending bus request is moved from its input port to the associated storage buffer. For example, if the selected bus request was output from the storage buffer A 50 in step 72, then in step 76 the bus controller 24 determines whether there is a bus request pending in the input port A 42. If so, then the bus controller 24 moves the pending bus request from the input port A 42 to the storage buffer A 50. After step 78 or a negative response in step 76, the method returns to step 68 to arbitrate between the bus requests that are pending. It will be appreciated that the steps shown in FIG. 3B can be performed in parallel with the steps shown in FIG. 3A such that a bus request can be selected by arbitration and output to the processor bus 12 while new bus requests are being received at the input ports 42, 44.

Based on the foregoing discussion, it will be understood that the invention employs a pipelining arbitration mechanism that buffers the first bus request from each bus requester to allow the bus requesters to begin generating second bus requests before the first bus requests are arbitrated. As such, the invention can perform arbitration between first bus requests in parallel with the generation of the second bus requests by the bus requesters. Thus, the invention enables the arbitration to keep up with the ability of high bandwidth bus requesters to generate bus requests. Moreover, the invention provides greater arbitration flexibility by enabling the arbitration decision to be based on plural bus requests from each bus requester.

It should be understood that even though numerous advantages of the present invention have been set forth in the foregoing description, the above disclosure is illustrative only. Changes may be made in detail and yet remain within the broad principles of the present invention.

I claim:

1. A computer-implemented method of interfacing a plurality of bus requesters with a computer bus, the method comprising:

receiving at a bus controller a plurality of respective first bus requests from the plurality of bus requesters;

receiving a second bus request from a first one of the plurality of bus requesters:

storing one of the first bus requests in the bus controller while another one of the first bus requests is retained in storage in the bus controller; and arbitrating between the first bus requests for access to the computer bus, the arbitrating step selecting one of the first bus requests for transmission on the computer bus, wherein the arbitrating step includes arbitrating between the first bus requests and the second bus request and selecting for transmission on the computer bus the first and second bus requests from the first one of the plurality of bus requesters before selecting the first bus request from a second one of the plurality of bus requesters.

2. The method of claim 1, further comprising:

transmitting to each of the plurality of bus requesters an indication that the first bus request for the bus requester is stored in the bus controller, the indication enabling the bus requester to prepare a second bus request to the bus controller while the first bus request for the bus requester is stored in the bus controller.

3. The method of claim 2, further comprising:

preparing the second bus request in a first one of the plurality of bus requesters while the first bus request from the first bus requester is stored in the bus controller.

4. A computer-implemented method of interfacing a plurality of bus requesters with a computer bus, the method comprising:

receiving at a bus controller a first bus request from a first one of the plurality of bus requesters;

storing the first bus request in the bus controller;

receiving at the bus controller a first bus request from a second one of the plurality of bus requesters, storing the first bus request from the second one of the plurality of bus requesters in the bus controller simultaneously with the storage of the first request from the first one of the plurality of bus requesters;

transmitting to the first one of the plurality of bus requesters an indication that the first bus request received from the first one of the plurality of bus requesters is stored in the bus controller, the indication enabling the first one of the plurality of bus requesters to prepare a second bus request;

after storing the first bus request from the first one of the plurality of bus requesters, selecting the first bus request from the first one of the plurality of bus requester for transmission on the computer bus;

preparing and transmitting the second bus request from the first one of the plurality of bus requesters while the first bus request is stored in the bus controller;

receiving the second bus request from the first one of the plurality of bus requesters wherein the selecting step includes arbitrating between the first bus requests and the second bus request; and wherein the arbitrating step includes selecting for transmission on the computer bus the first and second bus requests from the first one of the plurality of bus requesters before selecting the first bus request from the second one of the plurality of bus requesters.

5. The method of claim 4 wherein the selecting step includes arbitrating between the first bus requests while the first bus requests are stored in the bus controller.

6. A bus controller for interfacing a plurality of bus requesters with a computer bus, comprising:

a plurality of input ports that receive a plurality of respective first bus requests from the plurality of bus requesters;

a plurality of storage buffers that store the first bus requests, the plurality of storage buffers including a storage buffer for each of the plurality of bus requesters; and a bus arbiter that causes the first bus requests to be transferred from the plurality of input ports to the plurality of storage buffers for storage therein wherein the bus arbiter is structured to arbitrate between the first bus requests and thereby select one of the first bus requests for transmission on the computer bus and wherein the bus arbiter is structured to select the first bus request and a second bus request from a first one of the plurality of bus requesters before selecting the first bus request from a second one of the plurality of bus requesters even if the first bus request from the second one of the plurality of bus requesters was received by the bus controller before receiving the second bus request from the first one of the plurality of bus requesters.

7. The bus controller of claim 6, further comprising:

an output port coupled to the computer bus and the plurality of storage buffers, wherein the bus arbiter is structured to transmit the selected bus request from the plurality of storage buffers to the computer bus via the output port.

8. The bus controller of claim 6 wherein the bus arbiter is structured to transmit to each of the plurality of bus requesters an acknowledgment indicating that the first bus request from the bus requester is stored in the plurality of storage buffers.

9. A computer system for interfacing a plurality of bus requesters with a computer processor, comprising:

a computer bus coupled to the computer processor; and a bus controller coupling the plurality of bus requesters to the computer bus, the bus controller including:

a plurality of input ports that receive a plurality of respective first bus requests from the plurality of bus requesters;

a plurality of storage buffers that store the first bus requests, the plurality of storage buffers including a storage buffer for each of the plurality of bus requesters; and a bus arbiter that causes the first bus requests to be transferred from the plurality of input ports to the plurality of storage buffers for storage therein and transmits to each of the plurality of bus requesters an acknowledgment signal indicating that the first bus request from the bus requester is stored in the plurality of storage buffers, wherein the bus arbiter is structured to select the first bus request and a second bus request from a first one of the plurality of bus requesters before selecting the first bus request from a second one of the plurality of bus requesters even if the first bus request from the second one of the plurality of bus requesters was received by the bus controller before receiving the second one of the plurality of bus request from the first one of the plurality of bus requesters.

10. The computer system of claim 9 wherein the bus controller further includes:

an output port coupled to the computer bus and the plurality of storage buffers, wherein the bus arbiter is structured to transmit the selected bus request from the plurality of storage buffers to the computer bus via the output port.

11. A computer-implemented method of interfacing a plurality of bus requesters with a computer bus, the method comprising:

receiving at a bus controller a plurality of respective first bus requests from the plurality of bus requesters;

storing the first bus request from each of the plurality of bus requesters;

transmitting to each of the plurality of bus requesters an indication that the first bus request received from the bus requester is stored, the indication enabling the bus requester to prepare a second bus request;

receiving a second bus request from at least one of the plurality of bus requesters while the first bus request from the one bus requester is stored; and selecting one of the first or second bus requests for transmission on the computer bus, wherein the selecting step includes selecting the second bus request from a first one of the plurality of bus requesters before selecting the first bus request from a second one of the plurality of bus requesters.

12. The method of claim 11 wherein the storing step includes storing the first bus requests in the bus controller.

* * * * *